(12) United States Patent
Briefer

(10) Patent No.: US 6,496,019 B1
(45) Date of Patent: Dec. 17, 2002

(54) TEMPERATURE COMPENSATED PRESSURE SENSOR NETWORK

(75) Inventor: Dennis K. Briefer, Berlin, MA (US)

(73) Assignee: Setra Systems, Inc., Boxborough, MA (US)

( * ) Notice: Subject to any disclaimer, the term of this patent is extended or adjusted under 35 U.S.C. 154(b) by 0 days.

(21) Appl. No.: 09/641,781

(22) Filed: Aug. 18, 2000

(51) Int. Cl.$^7$ .................. G01R 27/28; G01R 27/26; G01B 7/00; G01L 9/10
(52) U.S. Cl. .................. 324/652; 324/207.12; 324/654; 324/658; 324/685; 73/728
(58) Field of Search .................. 324/652, 654, 324/658, 668, 670, 685, 686, 225, 207.12; 73/718, 724, 708, 728

(56) References Cited

U.S. PATENT DOCUMENTS

| | | | | |
|---|---|---|---|---|
| 3,012,193 A | * | 12/1961 | Breen | 324/670 |
| 3,896,374 A | * | 7/1975 | Delaphon | 324/681 |
| 5,072,180 A | * | 12/1991 | Moreau | 324/207.12 |
| 5,442,962 A | * | 8/1995 | Lee | 73/718 |

* cited by examiner

Primary Examiner—N. Le
Assistant Examiner—Anjan K. Deb
(74) Attorney, Agent, or Firm—McDermott, Will & Emery

(57) ABSTRACT

A temperature compensated pressure sensor network for providing an output sensing signal representative of an applied pressure includes a reference oscillator circuit for providing a reference signal having an associated reference frequency. The oscillator circuit includes a first inductor pair electrically coupled in series, wherein the reference frequency is a predetermined function of a first inductance associated with the first inductor pair. The sensor network further includes a sensor circuit for providing a sensing signal having an associated sensing frequency. The sensor circuit includes a second inductor pair and a sensing capacitor electrically coupled in series, wherein the sensing frequency is a predetermined function of a second inductance associated with the second inductor pair and the applied pressure. The sensor network also includes a processor for receiving the reference signal and the sensing signal, and producing the output sensing signal. The output sensing signal is a predetermined function of the reference signal and the sensing signal. The first inductor pair is oriented with respect to the second inductor pair so as to minimize effects of inductive coupling, and temperature variation, between the first inductor pair and the second inductor pair. The first inductor and the second inductor are preferably electrically coupled in series opposition, and the third inductor and the fourth inductor are preferably electrically coupled in series opposition. The first inductor pair is preferably oriented substantially orthogonal to the second inductor pair.

15 Claims, 6 Drawing Sheets

TEMPERATURE COMPENSATED PRESSURE SENSOR NETWORK

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to pressure sensors, and more particularly, to pressure sensor networks that include temperature compensation mechanisms so as to be relatively insensitive to variations in ambient temperatures.

Prior art pressure sensor networks related to the present invention generally include a transducer component and a driver output component. A block diagram of an exemplary prior art pressure sensor network 10 is shown in FIG. 1. The transducer component 12 includes a capacitive or inductive pressure sensor 14 that produces a varying parameter 16, either capacitance or inductance, as a function of an applied pressure 18. For example, a capacitive transducer may incorporate a flexible, electrically conductive diaphragm positioned parallel to a stationary, electrically conductive plate at a nominal distance d. In this case, the variable parameter 16 includes the capacitance across the diaphragm and the stationary plate. Pressure applied to the flexible diaphragm causes the distance d to change, thus causing the capacitance to change.

The driver component 20 uses this varying parameter 16 as a component of a resonant tank circuit 22, such that the resonant frequency of the tank circuit varies as a function of the applied pressure 18. The driver component 20 produces a pressure signal 24 corresponding to the magnitude of the applied pressure 18. The pressure signal 24 may simply be the raw signal that the resonant tank circuit 22 generates, such that the frequency of the pressure signal 24 conveys the information regarding the applied pressure 18.

Alternately, the driver component 20 may perform a frequency-to-voltage or frequency-to-current conversion on the raw signal from the tank circuit 22, such that the voltage or current, respectively, of the pressure signal 24 conveys the information regarding the applied pressure 18. The pressure sensor network 10 may further include a processor 26 for receiving and converting the pressure signal 24 into a form that is more useful to a particular application. For example, the processor 26 may sample the pressure signal 24 and convert the embedded pressure information into a digit format that is useful to other processing components.

Due to physical characteristics of the pressure sensor 10, the relationship between the applied pressure 18 and the pressure signal 24 may vary as a function of external conditions that produce a change in the physical dimensions of pressure sensor 10. One exemplary external condition that can produce such a change is the ambient temperature, although other external conditions (e.g., humidity) can also produce such changes. For example, in a pressure sensor that incorporates a capacitive transducer as described hereinbefore, temperature variations typically cause dimensional variations to the diaphragm and conductive plate, which in turn modify the relationship between the applied pressure and the pressure signal. This relationship between the sensor temperature and the pressure to output relationship is commonly referred to as the temperature sensitivity of the sensor. Schemes to compensate for such temperature sensitivity typically involve characterizing temperature sensitivity over the operating temperature range, measuring the temperature of the transducer in real time and applying a compensating factor to the pressure signal 24 according to the characterized temperature sensitivity at the measured temperature.

One disadvantage to such compensation schemes is that in order to measure the transducer temperature in real time, additional components such as thermistors, thermocouples, etc., along with associated sensing circuitry, must be added to the pressures sensor. These additional components add cost and complexity to the sensor, and reduce overall reliability.

Another disadvantage to such compensation schemes is that often the transducer portion of the pressure sensor is physically removed from the driver portion, such that their respective temperatures may be different. When the driver portion of the sensor includes components that are also subject to temperature sensitivities, the different temperatures tend to compound the overall temperature sensitivity of the sensor, further complicating the compensation problem.

It is an object of the present invention to substantially overcome the above-identified disadvantages and drawbacks of the prior art.

SUMMARY OF THE INVENTION

The foregoing and other objects are achieved by the invention which in one aspect comprises a temperature compensated pressure sensor network for providing an output sensing signal representative of an applied pressure. The sensor network includes a reference oscillator circuit for providing a reference signal having an associated reference frequency. The oscillator circuit includes a first inductor, wherein the reference frequency is a predetermined function of a first inductance associated with the first inductor. The sensor network further includes a sensor circuit for providing a sensing signal having an associated sensing frequency. The sensor circuit includes a second inductor and a sensing capacitor electrically coupled in series, wherein the sensing frequency is a predetermined function of a second inductance associated with the second inductor pair and the applied pressure. The sensor network also includes a processor for receiving the reference signal and the sensing signal, and producing the output sensing signal. The output sensing signal is a predetermined function of the reference signal and the sensing signal. The first inductor pair is oriented with respect to the second inductor pair so as to minimize effects of inductive coupling, and parametric variation, between the first inductor and the second inductor. The parametric variation may include a variation in one or more physical dimensions due to temperature, humidity, and other external conditions or combinations of conditions. In an alternate embodiment, the first inductor includes an inductor pair electrically coupled in series, and the second inductor includes an inductor pair electrically coupled in series.

In another embodiment of the invention, the first inductor and the second inductor are electrically coupled in series opposition, and the third inductor and the fourth inductor are electrically coupled in series opposition.

In another embodiment of the invention, the first inductor pair is oriented substantially orthogonal to the second inductor pair.

In another embodiment of the invention, the first inductor pair including a first planar inductor and a second planar inductor disposed in a plane along a first axis, the second inductor pair including a third planar inductor and a fourth planar inductor disposed in the plane along a second axis.

In another embodiment of the invention, the first axis and the second axis are substantially orthogonal, and the first axis intersects the second axis at a point substantially equidistant between the first planar inductor and the second planar inductor.

In another embodiment of the invention, the first planar inductor produces a first flux in a direction substantially orthogonal to the plane, the second planar inductor produces a second flux in a direction substantially parallel but opposite to that of the first flux, the third planar inductor produces a third flux in a direction substantially orthogonal to the plane, and the fourth planar inductor produces a fourth flux in a direction substantially parallel but opposite of the third flux.

In another embodiment of the invention, a first distance from a center of the first planar inductor to a center of the third planar inductor is substantially equal to a second distance from a center of the second planar inductor to a center of the third planar inductor.

In another embodiment of the invention, a first distance from a center of the first planar inductor to a center of the fourth planar inductor is substantially equal to a second distance from a center of the second planar inductor to a center of the fourth planar inductor.

In another embodiment of the invention, the processor executes a sequential procedure using the reference signal as a sequencing timebase and the sensing signal as an input, such that a variation in the reference frequency compensates for a variation in the sensing frequency.

In another embodiment of the invention, the sensing capacitor is characterized by an associated capacitance that varies as a predetermined function of the applied pressure.

In another aspect, the invention comprises a method of providing an output sensing signal representative of an applied pressure. The method includes the step of providing a reference signal having an associated reference frequency and being generated by an oscillator circuit including a first inductor pair electrically coupled in series. The reference frequency is a predetermined function of a first inductance associated with the first inductor pair. The method further includes the step of providing a sensing signal having an associated sensing frequency and being generated by a sensor circuit including a second inductor pair and a sensing capacitor electrically coupled in series. The sensing frequency is a predetermined function of a second inductance associated with the second inductor pair and the applied pressure. The method also includes the step of producing the output sensing signal being a predetermined function of the reference signal and the sensing signal. The method further includes the step of orienting the first inductor pair with respect to the second inductor pair so as to minimize effects of inductive coupling, and parametric variation, between the first inductor pair and the second inductor pair. The parametric variation may include a variation in one or more physical dimensions due to temperature, humidity, and other external conditions or combinations of conditions.

Another embodiment of the invention further includes the step of orienting the first inductor pair substantially orthogonal to the second inductor pair.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
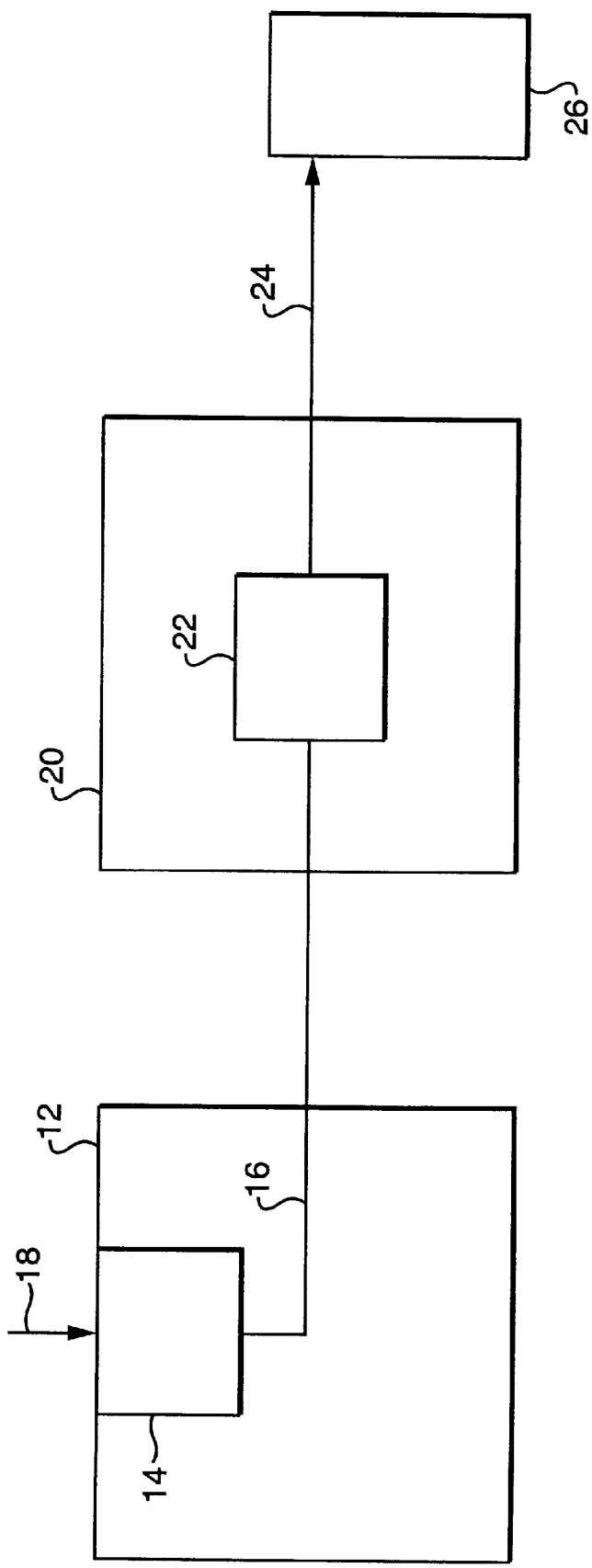
FIG. 1 shows a block diagram of an exemplary prior art pressure sensor network.
Figure 2:
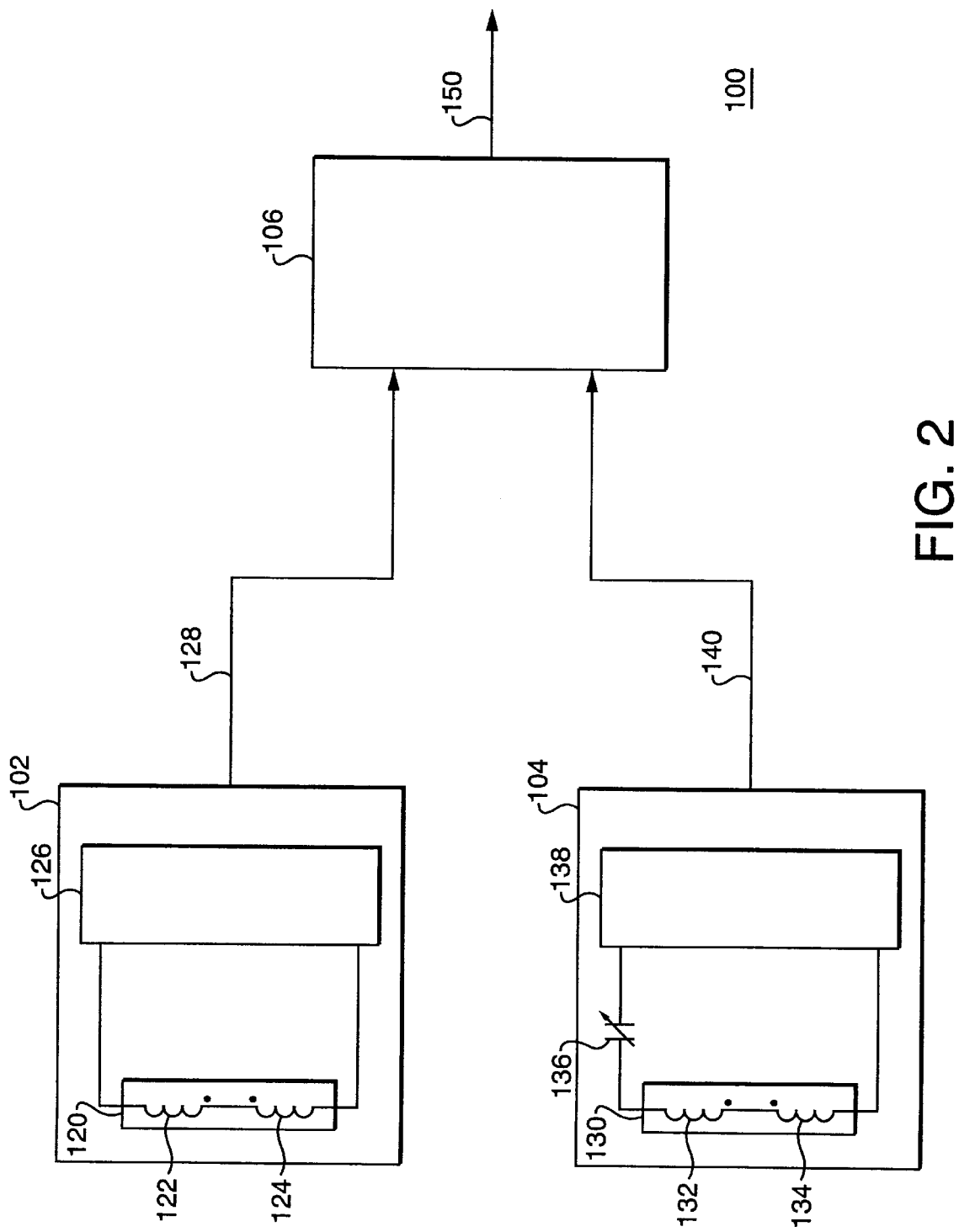
FIG. 2 shows a sectional view of one preferred embodiment of a temperature compensated pressure sensor network according to the present invention.

FIG. 2 shows a sectional view of one preferred embodiment of a temperature compensated pressure sensor network 100 according to the present invention, including a reference oscillator circuit 102, a sensor circuit 104, and a processor 106. The reference oscillator circuit 102 includes a first inductor 122 and a second inductor 124, electrically coupled in series to form a first inductor pair 120 having an associated inductance $L_1$. The inductor pair 120 is a component in a resonant tank circuit 126. The resonant tank circuit 126 has an associated resonant frequency, also referred to herein as the "reference frequency," that is dependent on the component values of the tank circuit, including $L_1$. Thus, a change in $L_1$ results in a corresponding change in the reference frequency. The tank circuit 126 produces a reference signal 128 that oscillates at the reference frequency. In other embodiments of the invention, the tank circuit 126 may also include a component that modifies the reference signal such that the reference signal frequency is some multiple of the tank circuit resonant frequency. This multiple may be any real number greater than zero.

The sensor circuit 104 includes a third inductor 132 and a fourth inductor 134, electrically coupled in series to form a second inductor pair 130 having an associated inductance $L_2$. The sensor circuit 104 further includes a sensing capacitor 136 having a characteristic capacitance $C_S$, electrically coupled to the inductor pair 130. The sensing capacitor 136 and the inductor pair 130 are components in a resonant tank circuit 138. The resonant tank circuit 138 has an associated resonant frequency, also referred to herein as the "sensing frequency," that is dependent on the component values of the tank circuit, including $L_2$ and $C_S$. Thus, a change in $L_2$ results in a corresponding change in the sensing frequency, and a change in $C_S$ results in a corresponding change in the sensing frequency. The tank circuit 138 produces a sensing signal 140 that oscillates at the sensing frequency. In other embodiments of the invention, the tank circuit 138 may also include a component that modifies the sensing signal such that the sensing signal frequency is some multiple of the resonant frequency of the tank circuit 138. This multiple may be any real number greater than zero. The sensing capacitor 136 is preferably a transducing device that provides a capacitance value that varies with an applied pressure; thus, the sensing frequency varies with the applied pressure. An example of such a transducing device is disclosed in U.S. Pat. No. 5,442,962, entitled CAPACITIVE PRESSURE SENSOR HAVING A PEDESTAL SUPPORTED ELECTRODE, which is incorporated by reference herein. In other embodiments of the invention, the sensing capacitor may include a transducing device that provides a capacitance value that is proportional to some other physical parameter, such as temperature, acceleration, or dielectric constant of ambient media, among others.

The processor 106 receives the reference signal 128 from the reference oscillator circuit 102, receives the sensing signal 140 from the sensor circuit 104, and produces a output sensing signal 150 that is a predetermined function of the reference signal 128 and the sensing signal 140. In general, the output sensing signal 150 includes a characteristic that is representative of an applied pressure as defined herein, although in other embodiments the output sensing signal 150 may be representative of any physical parameter as described herein. In a preferred embodiment, the output sensing signal 150 includes a pulse width modulated (hereinafter "PWM") waveform that, when filtered, produces an analog signal having a frequency that is proportional to the applied pressure. In other embodiments, the output sensing signal 150 may include digital pulse train (e.g., a 50 percent duty cycle clock signal) having a period that is proportional to the applied pressure. In other embodiments, the output sensing signal 150 may convey the applied pressure in a format tailored to a particular destination. For example, the output sensing signal 150 could periodically convey the applied pressure in ASCII characters, either serially or in parallel format. Other protocols for conveying information known to those in the art are equally possible.

In one preferred embodiment, the processor 106 executes a sequential procedure that uses the sensing signal 140 as an input and uses the reference signal 128 as a timebase. For example, the processor may include a microcontroller such as the Microchip PIC16C558. In such an embodiment, the processor 106 uses the reference signal 128 as a clock input for incrementing the program counter, and uses the sensing signal 140 as a data input. As described in more detail herein, any changes in inductance of the inductors 122, 124, 132 and 134 due to temperature variations are substantially cancelled due to the orientation and position of those inductors relative to one another. Although a preferred symmetrical arrangement of the inductor coils is disclosed herein to describe the invention, other coil arrangements may also be used. In general, the present invention uses the orientation of coils relative to one another to overcome the effects of changes in component parameters (e.g., variations in physical dimensions) due to external influences (e.g., such as temperature variations).

Figure 3:
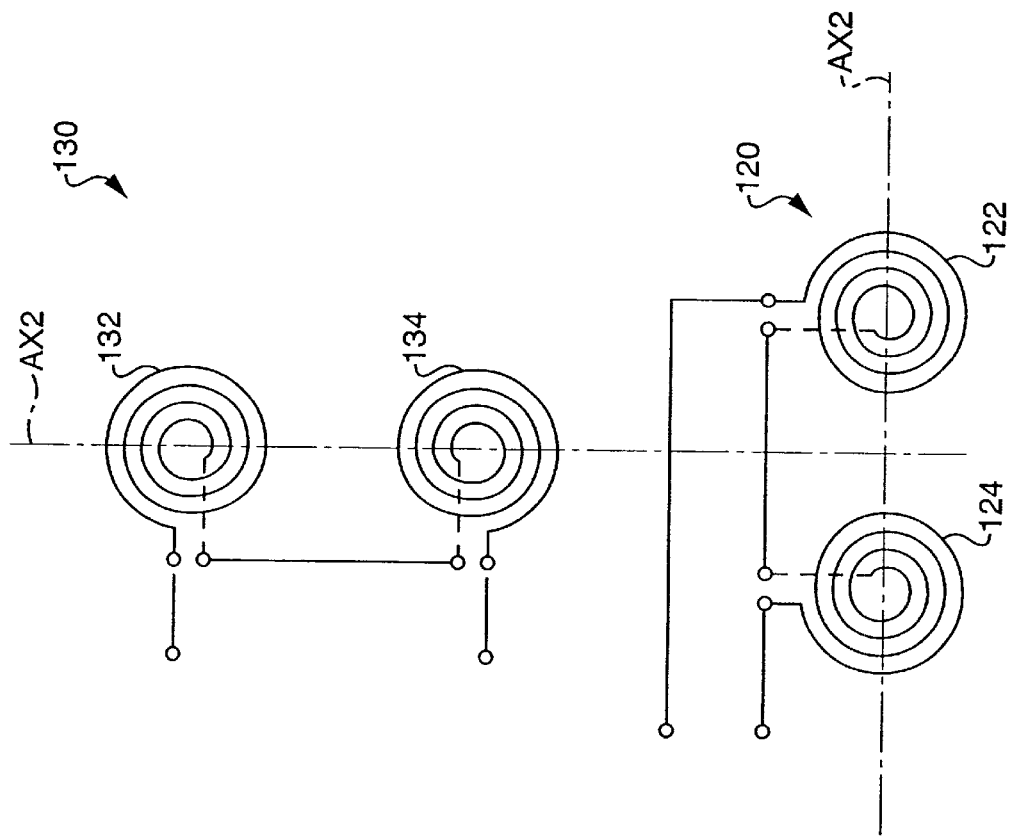
FIG. 3 shows a top view of two inductor pairs from the sensor network of FIG. 2.

In one preferred embodiment, the inductors 122, 124, 132 and 134 are oriented as shown in the top view of FIG. 3. In this embodiment, all inductors are described as substantially identical planar inductors disposed within a single plane, although other forms of inductors may also be used to provide similar effects. The first inductor pair 120 is disposed along a first axis AX1, the second inductor pair 130 is disposed along a second axis AX2, and the first axis AX1 is substantially orthogonal to the second axis AX2. Further, the second axis AX2 intersects the first axis AX1 at a point substantially equidistant between the first inductor 122 and the second inductor 124. Each pair of inductors are electrically coupled in series, as shown schematically in FIG. 2. Connecting the pairs of inductors in series causes the magnetic fields generated by the respective inductors in each pair to be in opposite directions, which locally cancels those fields, such that the net effect of the field produced by one combination of inductors connected in series upon the other inductors is negligible.

The orientation of the pairs of inductors 120 and 130 with respect to one another minimizes the interaction of the fields that the inductor pairs produce. For the orientation shown in FIG. 3, for example, the distance from the first inductor 122 to the third inductor 132 is substantially equal to the distance from the second inductor 124 to the third inductor 132. The magnitudes of the fields due to the first and second inductors 122 and 124 are thus substantially equal at the third inductor 132. Since the first and second inductors 122 and 124 are connected in series, their opposing fields influence the third inductor 132 equally, and thus cancel at the third inductor. Similarly, the opposing fields of the first and second inductors 122 and 124 cancel at the fourth inductor. By reciprocity, the effect of the field that the third inductor 132 produces has negligible effect on the first and second inductors 122 and 124 (in combination), and the effect of the field that the fourth inductor 134 produces has negligible effect on the first and second inductors 122 and 124. In summary, by using the orientation described in FIGS. 2 and 3, the invention largely decouples the fields associated with first inductor pair 120 from the fields associated with the second inductor pair 130, even in relatively close proximity.

The proximity of the inductor pairs 120 and 130 is such that the temperature gradient from one pair to the other is relatively small. In other embodiments, the temperature gradient can be further reduced, for example, by environmentally shielding the inductors in a common compartment, by mounting the inductors on a material that distributes heat relatively evenly, by providing a uniform air flow across the inductors, as well as by incorporating other methods known to those in the art. A relatively small temperature gradient ensures that any temperature variation affects all of the inductors by a substantially equal amount. Thus, when a temperature change occurs, the inductance L1 associated with the first inductor pair 120 and the inductance L2 associated with the second inductor pair 130 preferably change by a substantially equal amount. If the inductances L1 and L2 are equal to begin with, they remain equal after the temperature change. In other embodiments, the inductance L1 changes proportional to, rather than equal to, the inductance L2 with respect to temperature.

As described herein, the first inductor pair 120 (and corresponding inductance L1) is associated with the frequency of the reference signal 128, and the second inductor pair 130 (and corresponding inductance L2) is associated with the frequency of the sensing signal 140. The inductances L1 and L2 preferably change by an amount proportional to one another, so that the change in the frequency of the reference signal 128 (due to the change in inductance L1) is proportional to the change in frequency of the sensing signal 140 (due to the change in inductance L2). Other relationships between the change in inductances L1 and L2 may also be accommodated by the present invention. The processor 106 uses reference signal 128 to process the sensing signal 140 such that a variation in the frequency of any one of these signals results in an error in the output sensing signal 150. However, relationship between the reference signal 128 and the sensing signal 140 within the processor 106 is such that an equal change in frequency of the signals results in no change in the output sensing signal; i.e., the change in frequency of one of the signals cancels the effect of an equal change in frequency of the other signal. Likewise, a proportional change in the frequency of one of the signals with respect to the other results in a reduced error that corresponds to the proportionality constant.

Figure 4:
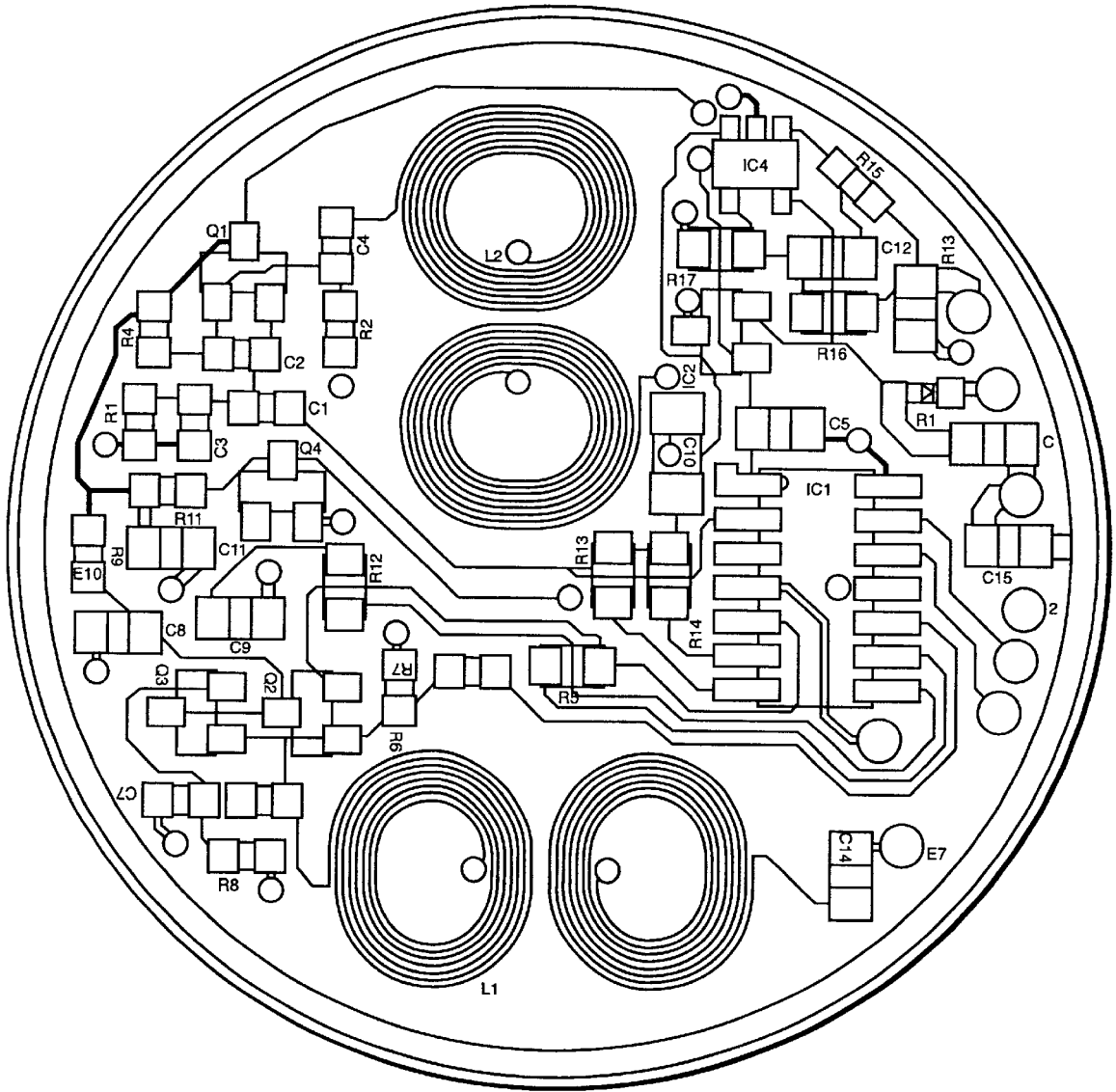
FIG. 4 shows a printed circuit board layout for one embodiment of the invention; and, FIG. 5 shows a schematic diagram of an embodiment of the temperature compensated pressure sensing network of FIG. 2.

FIG. 4 shows a printed circuit board layout for one preferred embodiment of the invention. FIG. 4 illustrates the first, second, third and fourth inductors 122, 124, 132, 134 implemented as printed circuit traces on the printed circuit board.

Figure 5A:
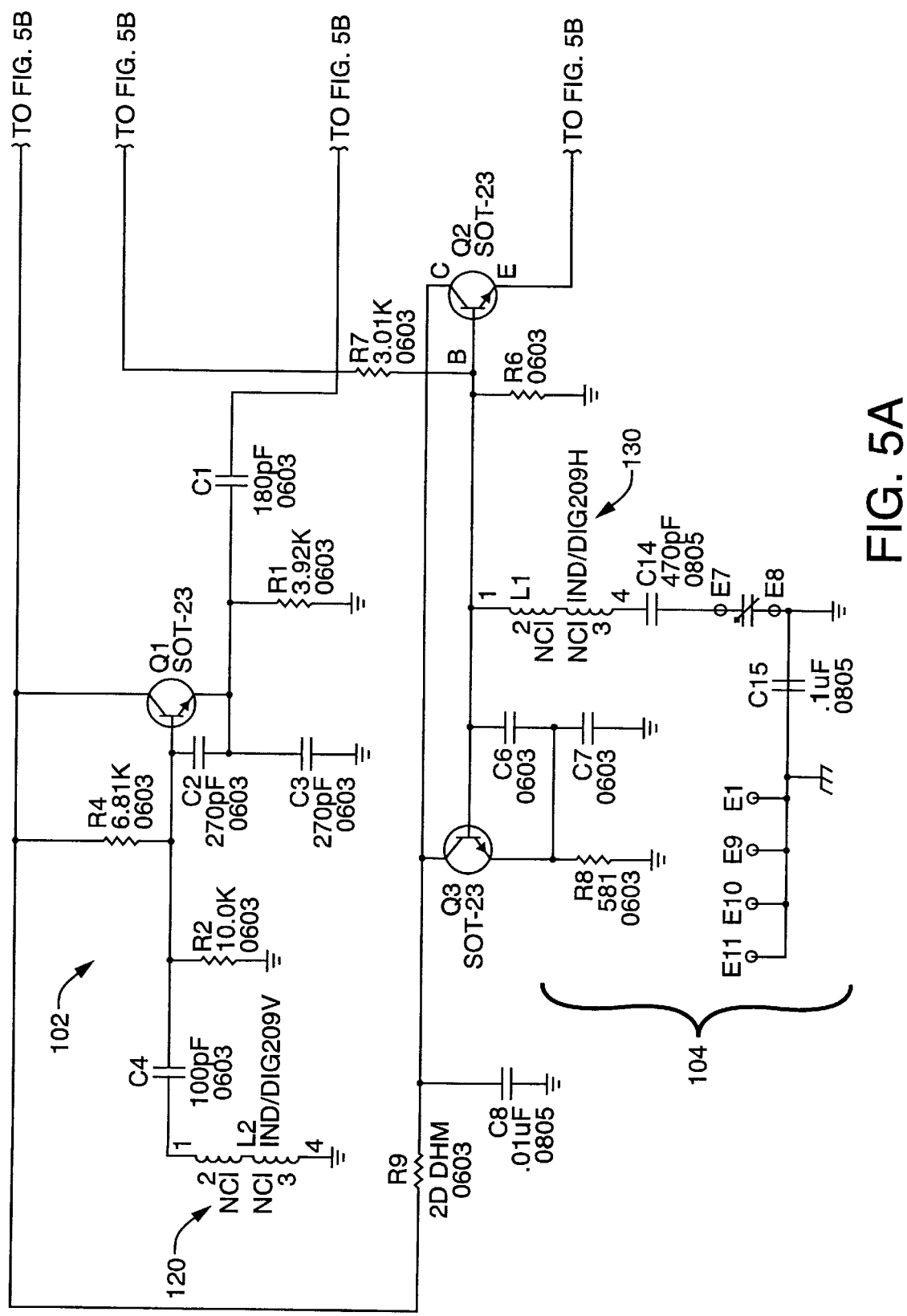
Figure 5B:
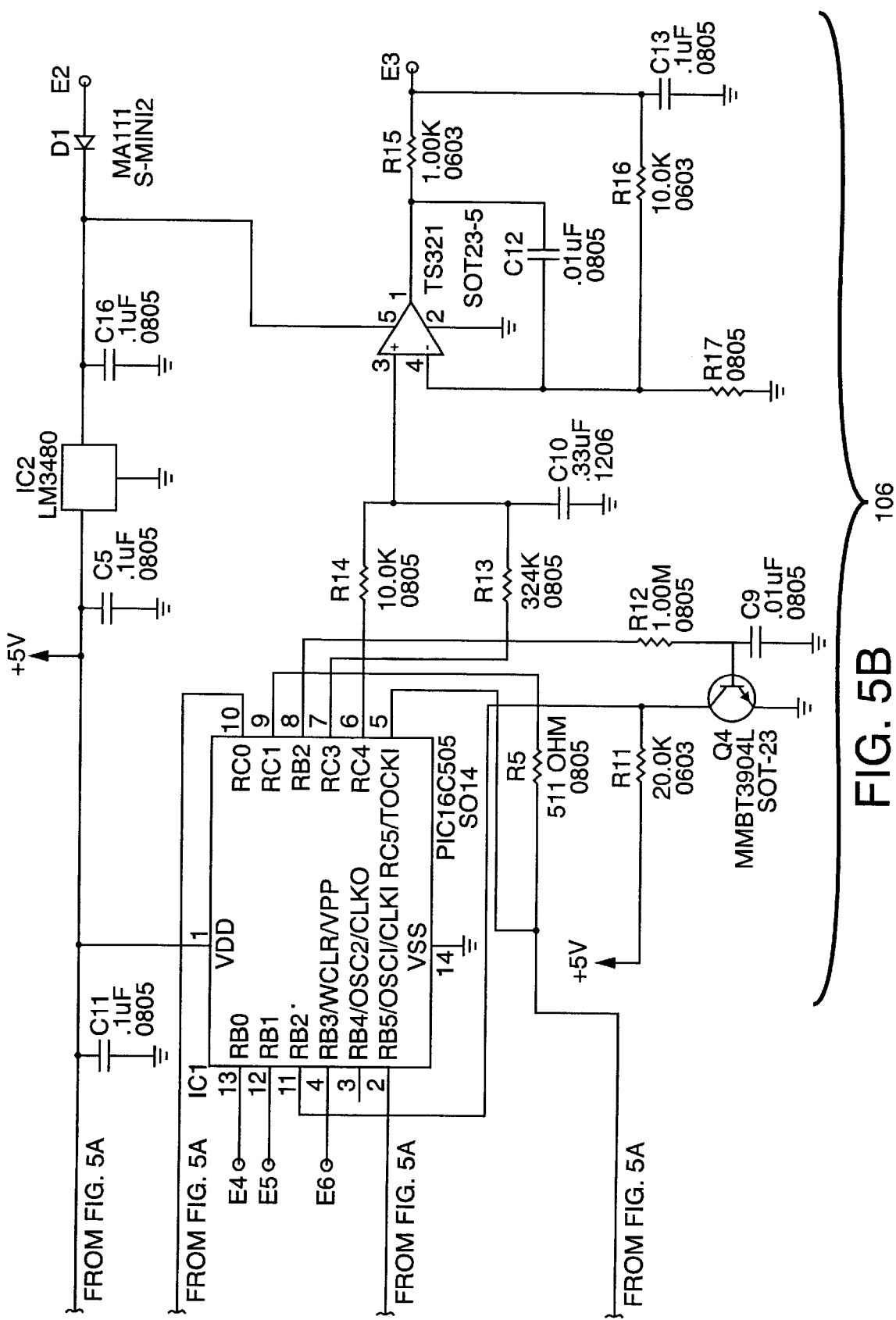

FIG. 5 shows a schematic diagram of one preferred embodiment a temperature compensated pressure sensing network according to the present invention.

Although the preferred embodiment described herein utilizes inductor pairs, other embodiments of this invention may utilize single inductors rather than pairs, so that the relative positioning of the inductors overcomes the effects of parametric variations due to changes in external conditions, as described herein. For example, the inductor pair 122 and 124 in FIG. 3 may be replaced by a single inductor L1, and the inductor pair 132 and 134 may be replaced by a single inductor L2, as long as the relative positioning of L1 and L2 provide the cancellation described herein as the particular parameters of the inductors vary.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A temperature compensated pressure sensor network for providing an output sensing signal representative of an applied pressure, comprising:
    a reference oscillator circuit for providing a reference signal having an associated reference frequency, said oscillator circuit including a first inductor wherein said reference frequency is a predetermined function of a first inductance associated with said first inductor;
    a sensor circuit for providing a sensing signal having an associated sensing frequency, said sensor circuit including a second inductor and a sensing capacitor electrically coupled in series, wherein said sensing frequency is a predetermined function of a second inductance associated with said second inductor and said applied pressure;
    a processor for receiving said reference signal and said sensing signal and producing an output sensing signal being a predetermined function of said reference signal and said sensing signal;
    wherein said first inductor is physically oriented with respect to said second inductor so as to minimize effects of (i) an inductive coupling, and (ii) a parametric variation, between said first inductor and said second inductor.

2. A pressure sensor network according to claim 1, said first inductor includes an inductor pair electrically coupled in series, and said second inductor includes an inductor pair electrically coupled in series.

3. A pressure sensor network according to claim 2, wherein inductors of said first inductor pair are electrically coupled in series, and inductors of said second inductor pair are electrically coupled in series, so as to create sets of opposing fields.

4. A pressure sensor network according to claim 2, wherein said first inductor pair is oriented substantially orthogonal to said second inductor pair.

5. A pressure sensor network according to claim 2, said first inductor pair including a first planar inductor and a second planar inductor disposed in a plane along a first axis, said second inductor pair including a third planar inductor and a fourth planar inductor disposed in said plane along a second axis.

6. A pressure sensor network according to claim 5, wherein said first axis and said second axis are substantially orthogonal, and said first axis intersects said second axis at a point substantially equidistant between said first planar inductor and said second planar inductor.

7. A pressure sensor network according to claim 5, wherein said first planar inductor produces a first flux in a direction substantially orthogonal to said plane, said second planar inductor produces a second flux in a direction substantially parallel but opposite to that of said first flux, said third planar inductor produces a third flux in a direction substantially orthogonal to said plane, and said fourth planar inductor produces a fourth flux in a direction substantially parallel but opposite of said third flux.

8. A pressure sensor according to claim 5, wherein a first distance from a center of said first planar inductor to a center of said third planar inductor is substantially equal to a second distance from a center of said second planar inductor to a center of said third planar inductor.

9. A pressure sensor according to claim 5, wherein a first distance from a center of said first planar inductor to a center of said fourth planar inductor is substantially equal to a second distance from a center of said second planar inductor to a center of said fourth planar inductor.

10. A pressure sensor network according to claim 1, wherein said parametric variation includes a variation in one or more physical dimensions of the inductors.

11. A pressure sensor network according to claim 1, wherein said processor executes a sequential procedure using said reference signal as a sequencing timebase and said sensing signal as an input, such that a variation in said reference frequency compensates for a variation in said sensing frequency.

12. A pressure sensor network according to claim 1, wherein said sensing capacitor includes an associated capacitance that varies as a predetermined function of said applied pressure.

13. A method of providing an output sensing signal representative of an applied pressure, comprising the steps of:
    providing a reference signal having an associated reference frequency and being generated by an oscillator circuit including a first inductor pair electrically coupled in series, wherein said reference frequency is a predetermined function of a first inductance associated with said first inductor pair;
    providing a sensing signal having an associated sensing frequency and being generated by a sensor circuit including a second inductor pair and a sensing capacitor electrically coupled in series, wherein said sensing frequency is a predetermined function of a second inductance associated with said second inductor pair and said applied pressure;
    producing said output sensing signal being a predetermined function of said reference signal and said sensing signal; and,
    physically orienting said first inductor pair with respect to said second inductor pair so as to minimize effects of (i) an inductive coupling, and (ii) a parametric variation, between said first inductor pair and said second inductor pair.

14. A method according to claim 13, further including orienting said first inductor pair substantially orthogonal to said second inductor pair.

15. A temperature compensated pressure sensor network for providing an output sensing signal representative of an applied pressure, comprising:

a reference oscillator circuit for providing a reference signal having an associated reference frequency, said oscillator circuit including a first inductor pair electrically coupled in series, wherein said reference frequency is a predetermined function of a first inductance associated with said first inductor pair;

a sensor circuit for providing a sensing signal having an associated sensing frequency, said sensor circuit including a second inductor pair and a sensing capacitor electrically coupled in series, wherein said sensing frequency is a predetermined function of a second inductance associated with said second inductor pair and said applied pressure;

a processor for receiving said reference signal and said sensing signal and producing an output sensing signal being a predetermined function of said reference signal and said sensing signal;

wherein said first inductor pair is physically oriented with respect to said second inductor pair so as to minimize effects of (i) an inductive coupling, and (ii) a parametric variation, between said first inductor pair and said second inductor pair.

* * * * *